United States Patent [19]
Alexander et al.

[11] Patent Number: 5,210,815
[45] Date of Patent: May 11, 1993

[54] HERMETICALLY SEALED OPTICAL FIBER FEEDTHROUGH

[75] Inventors: Wasserman Alexander, West Halls, Calif.; Kucherov Yakov, Sherman Oaks, Calif.

[73] Assignee: G & H Technology, Inc., Camarillo, Calif.

[21] Appl. No.: 865,844

[22] Filed: Apr. 9, 1992

[51] Int. Cl.⁵ .......................... G02B 6/26; G02B 6/32
[52] U.S. Cl. ........................... 385/138; 385/33; 385/35; 385/73; 385/74
[58] Field of Search ........................ 385/33, 34, 35, 73, 385/74, 75, 138, 139, 93

[56] References Cited

U.S. PATENT DOCUMENTS

| | | | |
|---|---|---|---|
| 3,951,515 | 4/1976 | Allard | 385/138 X |
| 4,290,667 | 9/1981 | Chown | 385/33 X |
| 4,345,816 | 8/1982 | Nakai et al. | 385/138 X |
| 4,360,249 | 11/1982 | Slemon | 385/138 X |
| 4,682,846 | 7/1987 | Lowen | 385/138 X |
| 4,759,601 | 7/1988 | Knutsen et al. | 385/138 X |
| 4,859,021 | 8/1989 | Wall | 385/138 X |
| 4,904,046 | 2/1990 | Paschke et al. | 385/138 X |
| 4,911,523 | 3/1990 | Sondergeld et al. | 385/35 X |
| 4,989,940 | 2/1991 | Wollenweber et al. | 385/35 X |
| 5,113,475 | 5/1992 | Baker | 385/138 |

FOREIGN PATENT DOCUMENTS 0402612 12/1990 European Pat. Off. .......... 385/35 X

*Primary Examiner*—Brian Healy
*Attorney, Agent, or Firm*—George J. Netter

[57] ABSTRACT

An optical fiber feedthrough (20,24) for passing through a panel (10) and maintaining a sealed relationship between different fluid environments existing on opposite sides of the panel. A guide tube (25) secured within an opening (44) in the panel (10) by a glass seal (46). The end portions of two fibers (16, 18) to be interconnected through the panel are secured within individual termini (28,42) with the latter located within the guide tube (25) and sealed by O-rings (50,56) against fluid passage therethrough.

9 Claims, 2 Drawing Sheets

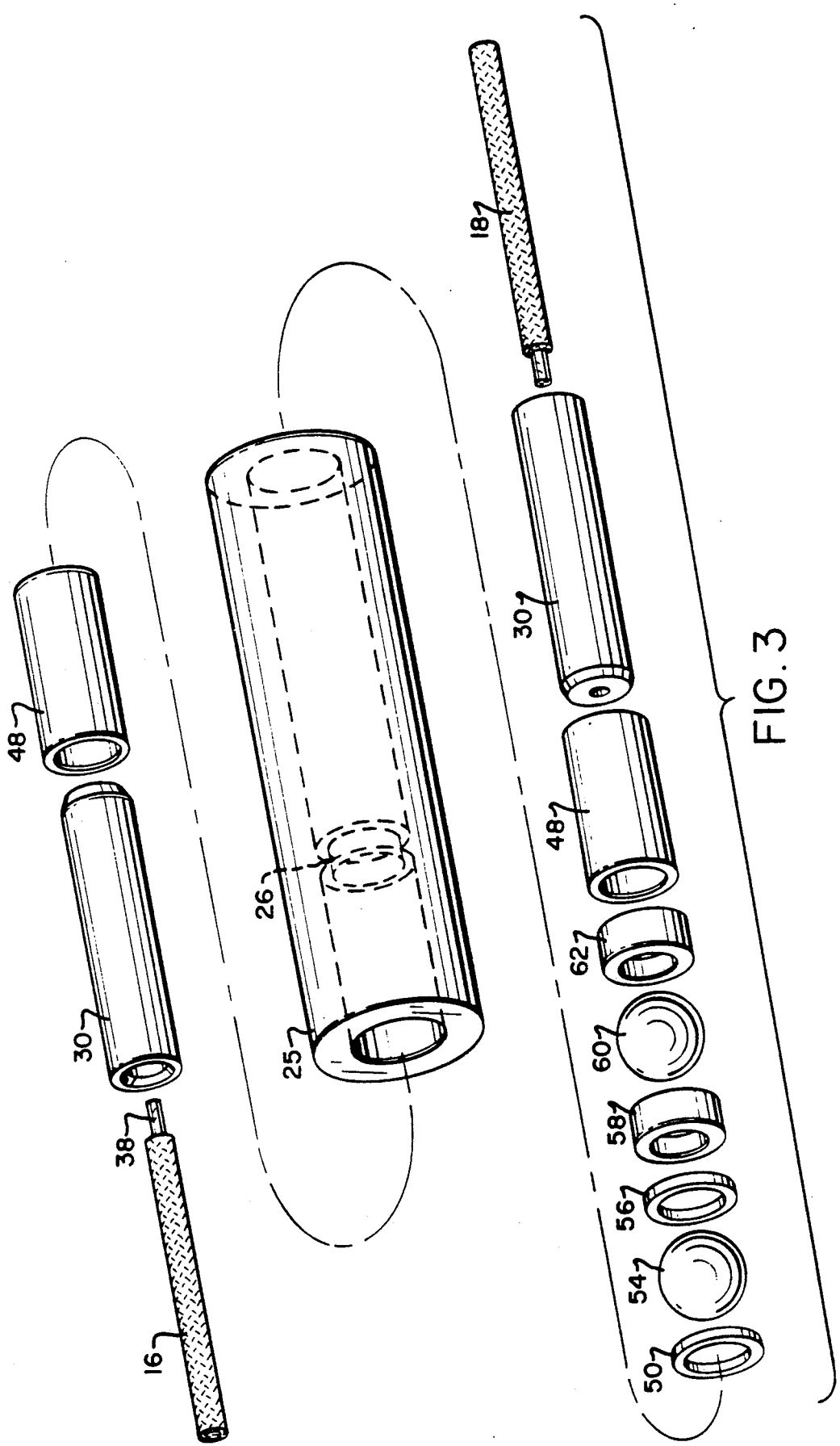

HERMETICALLY SEALED OPTICAL FIBER FEEDTHROUGH

BACKGROUND

1. Field of the Invention

The present invention relates generally to an optical fiber cable, and, more particularly, to a feedthrough enabling interconnecting two such cables through a wall, panel or a pipe having an internal panel, and which feedthrough is hermetically sealed to prevent access and passage of pressurized fluids (liquids or gases) therethrough.

2. Description of Related Art

Optical fibers which are used to transmit light signals from one point to another frequently are required to pass from one fluid pressure environment to a different fluid pressure environment and the two environments are separated by a wall or panel hereinafter merely referenced to as a panel. In this case, the fiber must pass through the wall or panel and be secured at the panel in a manner to produce hermetic sealing completely about the fiber as well as through the device used to mount it into the panel in order that the high pressure side fluid will not be able to pass through the panel and undesirably be added to the fluid contained on the low pressure side of the panel.

Also, although under some circumstances it may be possible to hermetically retain a whole unbroken fiber within an opening in the panel separating two different pressure environments, in the usual case, it is far more convenient to break the fiber or to connect two fibers via so-called termini which are, in turn, mounted to the panel. It is in this latter situation that the invention described herein is most advantageously employed.

Although there are a number of termini known and used at this time for effecting connections between the ends of a broken fiber or between two separate fibers, none are known that possess fully satisfactory hermetic sealing requirements along the fiber and through the terminus interior parts. For example, in U.S. Pat. No. 4,290,667 each fiber has its end portion received within a capillary tube with a faced off fiber end located at the focal point of a lens. A pair of such fiber and lens devices are located at opposite ends of an alignment sleeve to form a fiber connector having two termini. However, the arrangement is strictly accomplished by mere contact with the various terminus parts which would not prevent a pressurized fluid (e.g., air or gas) from passing through the interior of the termination device.

In addition, known termini are expensive and complex to manufacture and have as a most serious objection the fact that they are difficult to use in a practical context as well as being quite frequently not reliable in operation. Still further, highly trained personnel are frequently required for fabricating and utilizing the known devices since assembly of the devices must be accomplished in a manner to avoid even extremely small (microscopic) dust particles from becoming located between the fiber ends to be terminated, which particles could otherwise produce a substantial reduction in the fiber cable light transmission efficiency.

SUMMARY OF THE DISCLOSURE

A hollow tubular metal feedthrough guide tube includes spaced inwardly from one end a continuous radially inwardly directed flange. A sleeve is received within the guide tube and has its inner end abutting against the internal flange. Within the sleeve, there is located a ferrule containing an optical fiber with a faced-off end coextensive to the outer end surface of the ferrule. The ferrule with included fiber is moved forward in the guide tube until it abuts against the internal flange. This entire assembly of guide tube, sleeve, and ferrule with included fiber is a single optical fiber terminus.

From the opposite side of the feedthrough guide tube, there is provided, in the order named from the inside to the outside, an O-ring of resilient material, a first lens, a further O-ring, a washer spacer, a second lens, a second washer spacer, and a second terminus. The entire feedthrough guide tube is then secured within an opening in a panel between the two environments of differing pressures and secured within the wall by an hermetic sealing material such as glass, for example.

The differing pressure fluid is unable to make its way through the panel wall outwardly of the feedthrough because of the hermetic sealing material, nor can it pass through the internal portion of the optical fiber termini within the feedthrough cylinder because of the two O-rings engaging the first lens and sealing it within the feedthrough guide tube.

DESCRIPTION OF THE DRAWING

In the accompanying drawing:

FIG 3 is an exploded view of the feed-through device of this invention.

DESCRIPTION OF A PREFERRED EMBODIMENT

Figure 1:
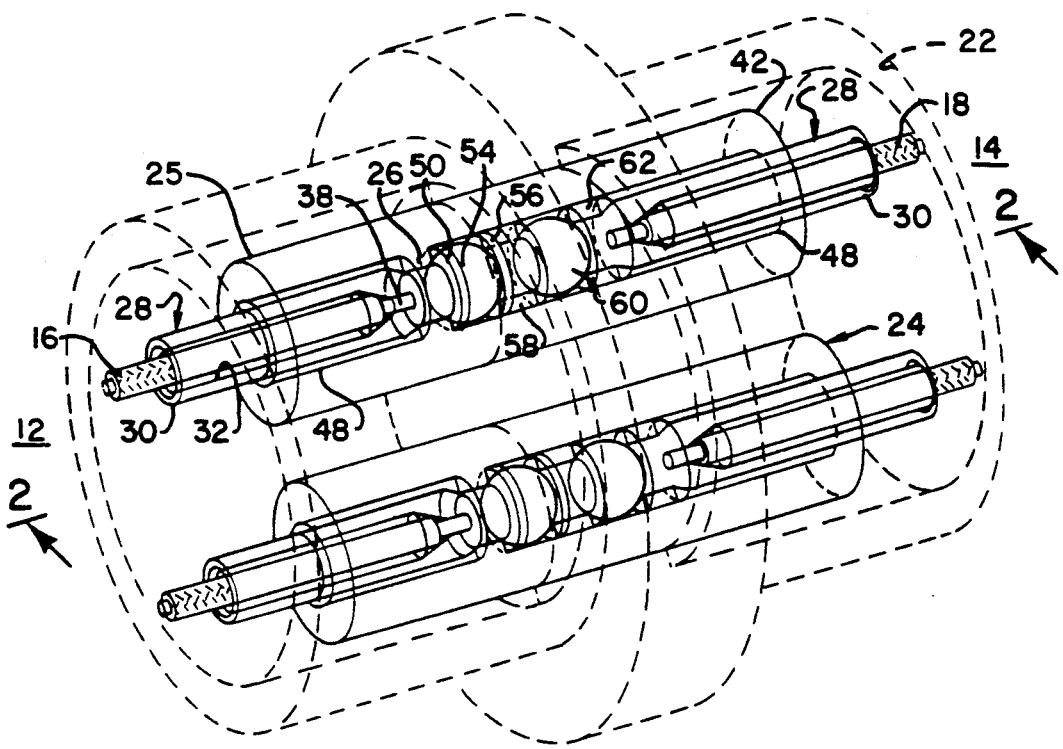
FIG. 1 is a perspective view of a panel or wall with optical fiber feed-through device of the present invention.

With reference now to the drawing and particularly FIG. 1 there is shown a panel 10 separating two environments enumerated generally as 12 and 14 which contain fluids of different chemical composition, differing pressures, or both, and which it is desired to maintain separated. That is, the panel or wall 10 must be maintained in hermetic condition. It is also a desideratum that an optical fiber 16 pass through this same panel and be interconnected to a further optical fiber 18 on the opposite side of the panel wall, and that a feedthrough 20 for accomplishing all of this be completely hermetic. Although the device is described as interconnecting two different fibers, the present invention will function just as well with more than two fibers or just a single fiber being broken and interconnected in a way to be described.

Although the panel 10 separating two different pressured environments may be a wall of a chamber or enclosure, it will bescribed here for simplicity purposes as being enclosed within a tube or pipe 22 which has its opposite ends communicating with the two different environments 12 and 14, respectively. Moreover, although it will be described in detail in connection with but a single such device 20, it is considered within the scope of this invention to provide two or more such devices, depicted generally as the device 24 for handling a corresponding number of additional fiber pairs.

Figure 2:
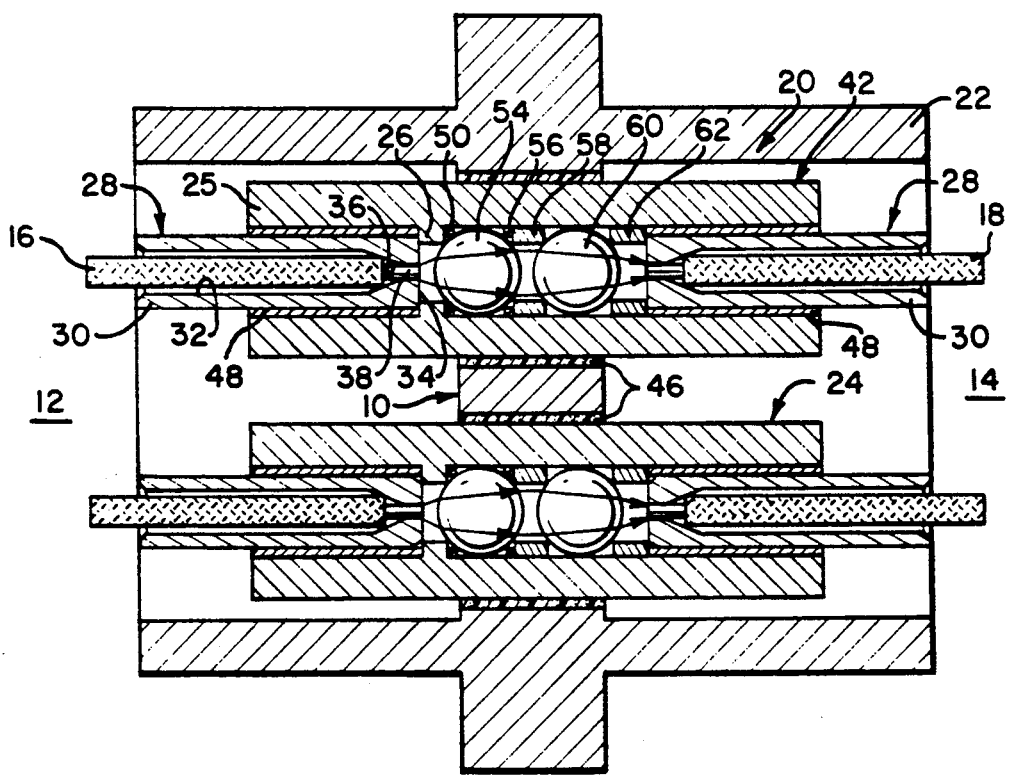
FIG. 2 is a side elevational, sectional view taken along the line 2—2 of FIG. 1.

For the ensuing details of the feed-through device 20 reference is made simultaneously to FIGS. 2 and 3. As shown there, a hollow guide tube 25 serves as the outer housing for the feedthrough 20 parts. The tube includes on its inner surface at a point closer to one end, but spaced substantially from that same end, a radially inwardly directed flange 26.

A terminus for terminating the fiber 16 in a manner satisfactory for present purposes is enumerated generally as 28. The terminus includes a cylindrical ferrule 30 having a cavity 32 which opens to the exterior at the outer end of the ferrule and which is of such cross-sectional dimensions as to enable ready receipt of the fiber 16 with cladding and strength member within the cavity without being pressed by the ferrule interior wall surfaces. The ferrule opposite or inner end portion 34 has a relatively small axial opening 36 of a diameter just sufficient to enable a bare fiber core 38 to be received therein. The outer end surface 40 of portion 34 is precisely faced-off at right angles to the opening 36 axis.

In assembly, the outer end of the fiber 16 is faced-off very precisely at 90-degrees to the fiber axis and cemented within the opening 36 (e.g., by an epoxy) with the faced-off end surface accurately located to lie inwardly of the plane of the ferrule outer end surface 40.

A second terminus 42 for mounting onto the end of the optical fiber 18 is constructed in the same manner as the just described first terminus 28.

In assembly of the pass-through device 20 and mounting to the panel 10, the first step is to locate the guide tube 25 within a suitably dimensioned opening 44 in the panel and physically anchoring the tube in place and hermetically sealing the tube outer surface to the panel by a quantity of molten glass 46, for example. On the glass seal setting up, the ferrule 30 with included fiber forming the first terminus 28 is then placed within a sleeve 48 and the sleeve press fit into the guide tube 25 until it abuts against the flange 26 which properly locates the faced-off end of the fiber for a purpose to be identified. Next, a first O-ring 50 of outer dimensions closely matching those of the guide tube bore 52 is moved into the bore from the tube end opposite that within which the terminus 28 is received, and the O-ring is positioned to abut against the flange 26. Then, in the order given, a first lens 54, a second O-ring 56, a first washer spacer 58, second lens 60 and second washer spacer 62 are located within the guide tube bore in contacting relation to immediately adjacent parts. Finally, the second terminus 42 is inserted into the guide tube bore and abutted against the second washer spacer 62. The widths of the flange and two washer spacers and the focal distances of the spherical lenses are such that light images at the end face of one fiber (e.g., optical fiber 16) will focus precisely onto the end face of the other fiber and, in that way, assure maximum light signal transmission efficiency between the two fibers located in the pass-through device 20.

By use of the described feed-through device, two optical fibers for carrying light signals are interconnected through a wall or panel separating two environments consisting of different fluids that it is desired not to mix or consisting of fluids at different desired not to mix or consisting of fluids at different pressures that it is desired not to allow leakage therebetween. That is, the feed through device provides a hermetic sealing relationship between the two environments while achieving optimal light signal transmission between two optical fibers.

Although the present invention has been described in connection with a preferred embodiment, it is to be understood that those skilled in the appertaining art may contemplate modifications that come within the spirit of the invention and within the ambit of the appended claims. For example, although the lenses are depicted as spherical they may be of other desired geometries.

What is claimed is:

1. A panel opening feedthrough device for first and second optical fibers located on opposite sides of the panel, comprising:

a guide tube sealed within the panel opening with its two ends located on opposite sides of the panel, said tube having an integral annular flange on its inner wall with a central opening therethrough;

a separate terminus provided on the end of each optical fiber;

a first sleeve press fit into an end of the guide and abutting against one side of the guide tube flange, the internal bore being such as to enable fitting receipt of the terminus of one of the fibers;

a first annular sealing means abutting against the flange other side;

first lens means having a first surface contacting the first annular sealing means;

a second annular sealing means contacting a further surface of the first lens means;

first washer spacer contacting the second annular sealing means;

second lens means contacting the first washer spacer;

second washer spacer contacting the second lens means; and a second sleeve press fit into the guide tube against the second washer spacer for receiving the other terminus therein.

2. A panel opening feedthrough device as in claim 1, in which the guide tube is sealed within the panel opening by a body of glass.

3. A panel opening feedthrough device as in claim 1, in which the annular sealing means are O-rings.

4. A panel opening feedthrough device as in claim 1, in which each terminus includes a ferrule with a passage of cross-section to receive the optical fiber with cladding and an opening in an end wall for fittingly receiving the bare core of the fiber.

5. A panel opening feedthrough device as in claim 1, in which the fluid environments on opposite sides of the panel differ from one another.

6. A passthrough device sealed within a panel opening for a pair of separable optical fiber termini optically interrelated by lens means, comprising:

a hollow open-ended guide tube sealed within the panel opening and respectively receiving the optical termini within opposite ends; and annular means located within the guide tube between the termini for sealing the guide against passage of fluid therethrough.

7. A passthrough device as in claim 6, in which the guide tube includes an internal flange against which one of the termini abuts forming a positive limit stop for the said termini.

8. A passthrough device as in claim 7, in which the annular means includes an O-ring that sealingly abuts against the flange and immediately adjacent guide tube surfaces.

9. A passthrough device as in claim 6, in which each terminus is received within a sleeve which is press fit within the guide tube.

* * * * *